United States Patent
Kawada

(10) Patent No.: US 8,739,424 B2
(45) Date of Patent: Jun. 3, 2014

(54) STRUCTURE FOR PROTECTING SCALE GRADUATIONS

(75) Inventor: Hiroaki Kawada, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 177 days.

(21) Appl. No.: 13/524,239

(22) Filed: Jun. 15, 2012

(65) Prior Publication Data

US 2012/0324750 A1 Dec. 27, 2012

(30) Foreign Application Priority Data

Jun. 24, 2011 (JP) .................................. 2011-141010
Jun. 24, 2011 (JP) .................................. 2011-141011

(51) Int. Cl.
*G01D 5/347* (2006.01)

(52) U.S. Cl.
USPC .......................................................... 33/706

(58) Field of Classification Search
USPC ............ 33/706, 707, 708; 523/440–444, 457, 523/466; 524/401–456, 492–494
See application file for complete search history.

(56) References Cited

U.S. PATENT DOCUMENTS

| | | | |
|---|---|---|---|
| 6,675,491 B2 * | 1/2004 | Sasaki et al. ..................... | 33/706 |
| 7,007,397 B2 * | 3/2006 | Kodama et al. .................. | 33/706 |
| 7,934,324 B2 * | 5/2011 | Tomiya et al. ................... | 33/706 |
| 2004/0154180 A1 * | 8/2004 | Burgschat et al. .............. | 33/706 |
| 2005/0108888 A1 * | 5/2005 | Burgschat et al. .............. | 33/706 |
| 2007/0187583 A1 * | 8/2007 | Yaku et al. ............... | 250/231.13 |
| 2011/0272564 A1 * | 11/2011 | Kawada ..................... | 250/231.1 |
| 2012/0023769 A1 * | 2/2012 | Speckbacher et al. .......... | 33/707 |
| 2012/0266478 A1 * | 10/2012 | Frank et al. ..................... | 33/708 |
| 2013/0227853 A1 * | 9/2013 | Schmoller et al. .............. | 33/706 |

FOREIGN PATENT DOCUMENTS

JP 2002-318137 10/2002

* cited by examiner

*Primary Examiner* — G. Bradley Bennett
(74) *Attorney, Agent, or Firm* — Rankin, Hill & Clark LLP

(57) ABSTRACT

In a structure for protecting scale graduations, in which a graduation unit formed on a scale base is protected by a scale cover arranged on the top surface side of the graduation unit, a space between the scale base and the scale cover along the entire lateral periphery of the graduation unit is sealed using an adhesive agent mixed with a powder material such as a glass powder for blocking penetration of graduations-deteriorating components, to form a periphery adhesive layer. The scale cover may be supported on the scale base by a height regulating unit provided along the periphery of the graduation unit, so that variations in encoder output due to unevenness in thickness of the adhesive agent for joining the scale cover with the graduation unit can be prevented.

14 Claims, 4 Drawing Sheets

Measurement (Movement) Direction

Width Direction

Width Direction

STRUCTURE FOR PROTECTING SCALE GRADUATIONS

CROSS-REFERENCE TO RELATED APPLICATION

The disclosure of Japanese Patent Applications No. 2011-141010 and No. 2011-141011 filed on Jun. 24, 2011 including specifications, drawings and claims are incorporated herein by reference in its entirety.

BACKGROUND OF THE INVENTION

1. Field of the Invention

The present invention relates to a structure for protecting scale graduations and, more particularly, to a structure for protecting scale graduations that is suitably applicable to the cases where aged deterioration of the scale used for a linear encoder, arc encoder, rotary encoder and the like is to be avoided, and where output variations caused by the scale are to be reduced.

2. Description of the Related Art

A conventional linear encoder, for example as shown in FIG. 1 illustrating its outline, has a scale 10 and a detector 20 arranged to face each other. The linear encoder detects a relative displacement between the scale 10 and the detector 20 by relatively moving the scale 10 and/or the detector 20 in a measurement direction shown by a double-headed arrow.

In such a conventional scale 10 adapted to the encoder, a pattern of a graduation unit 14 is formed by a deposition technique on a main surface of a scale base 12 made of glass.

In some encoders, in which the scale 10 mainly made of glass and the detector 20 are arranged to face each other, a cover glass 16 is joined with the scale 10 to be a single unit in order to protect the graduation unit 14 of the scale 10 from scratches and stains, as shown in FIG. 2.

However, in order to join the cover glass 16 with the scale 10 to be a single unit as described above, as in FIG. 2 schematically showing the scale 10, an upper adhesive layer 18 is disposed between the top surface portion of the graduation unit 14 and the cover glass 16. In this case, aged deterioration of the graduation unit 14 is caused because a common adhesive agent is mainly made from an acrylic or epoxy resin and is likely to absorb graduations-deteriorating components including moisture and gas from the surrounding atmosphere. In particular, when the graduation unit 14 is made from metal, contrast decreases because its surface tarnishes, and when it is made of a photosensitive material, its properties change, thus resulting in the problem of reducing detection accuracy in both cases.

This problem similarly exists even when a space between the scale base 12 and the cover glass 16 along the entire lateral periphery of the graduation unit 14 is sealed using a periphery adhesive layer 18A including an adhesive agent of the same kind, in addition to the upper adhesive layer 18 between the top surface portion of the graduation unit 14 and the cover glass 16, as shown in FIG. 2.

Moreover, when the cover glass 16 is arranged on and joined with the adhesive layer (agent) 18 formed on the top surface portion of the graduation unit 14, another problem of variations in encoder output, which is outputted from the detector 20 as detection values, is caused due to unevenness in thickness of the adhesive agent existing in measurement (movement) direction orthogonal to the width direction in the drawing.

It should be noted that Japanese Patent Application Laid-Open No. 2002-318137 (hereinafter referred to as Patent Literature 1) discloses a technique of preventing intrusion of harmful coolant, oil and the like upon a scale electrode side by forming a coating layer on the scale electrode (graduation unit) with its pattern formed on a board. However, the similar problem also exists in this scale structure, because an adhesive agent is used to join the coating layer with a scale cover corresponding to the cover glass.

SUMMARY OF THE INVENTION

The present invention has been made in order to solve the above-described conventional problems, and it is a first object of the present invention to provide a structure for protecting scale graduations, in which a graduation unit formed on a scale base is protected by a scale cover arranged on the top surface side thereof, the structure capable of preventing aged deterioration of the graduation unit caused by graduations-deteriorating components such as moisture.

It is a second object of the present invention to provide a structure for protecting scale graduations, capable of preventing variations in encoder output caused by unevenness in thickness of an adhesive agent for joining the scale cover with the graduation unit.

A first aspect of the invention provides a structure for protecting scale graduations in which a graduation unit formed on a scale base is protected by a scale cover arranged on a top surface side thereof. In this structure, a space between the scale base and the scale cover along an entire lateral periphery of the graduation unit is sealed using an adhesive agent mixed with a powder material blocking penetration of graduations-deteriorating components, to thereby achieve the above-described first object.

In this structure, the powder material may be glass, ceramic or metal.

The powder material may be transparent or nontransparent.

The powder material may have a globular shape or an amorphous shape.

The powder material may have a particle diameter of several nm to several μm.

According to the first aspect of the invention, the space between the scale base and the scale cover that is arranged on the top surface side of the graduation unit on the scale base is sealed along the entire lateral periphery of the graduation unit using the adhesive agent mixed with the powder material blocking the penetration of the graduations-deteriorating components such as moisture. Thus the penetration of the graduations-deteriorating components into the graduation unit can be avoided without fail, so that the aged deterioration of the graduation unit can be prevented.

A second aspect of the invention provides a structure for protecting scale graduations in which a graduation unit formed on a scale base is protected by a scale cover arranged on a top surface side thereof. In this structure, the scale cover is supported on the scale base by a height regulating unit provided along a periphery of the graduation unit, to thereby achieve the above-described second object.

The height regulating unit is formed on a lower surface of the scale cover in advance to have a pattern corresponding to the periphery of the graduation unit, and, while a lower end of the height regulating unit is allowed to abut against a top surface of the scale base, the scale base and the scale cover can be joined with each other using an adhesive agent provided along the periphery of the height regulating unit.

The height regulating unit may be deposited on the lower surface of the scale cover.

The height regulating unit may be formed to have the same thickness continuously on the lower surface of the scale cover at a position corresponding to the entire periphery of the graduation unit.

In addition, the height regulating unit may be formed from metal including chromium, copper or aluminum.

The space between the scale base and the scale cover along the entire lateral periphery of the graduation unit may be sealed by an adhesive agent mixed with a powder material blocking penetration of graduations-deteriorating components.

According to the second aspect of the invention, the scale cover is supported on the scale base by the height regulating unit formed on its lower surface, and hence it is possible to omit the adhesive agent (layer) from the space between the graduation unit and the cover glass. Because varied dimension of the space (gap) between the graduation unit and the scale cover caused by unevenness in the thickness of the adhesive agent can be avoided, it is possible to make the space uniform and stabilize the encoder output.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, preferred embodiments of this invention will be described in detail with reference to the drawings.

Figure 3:
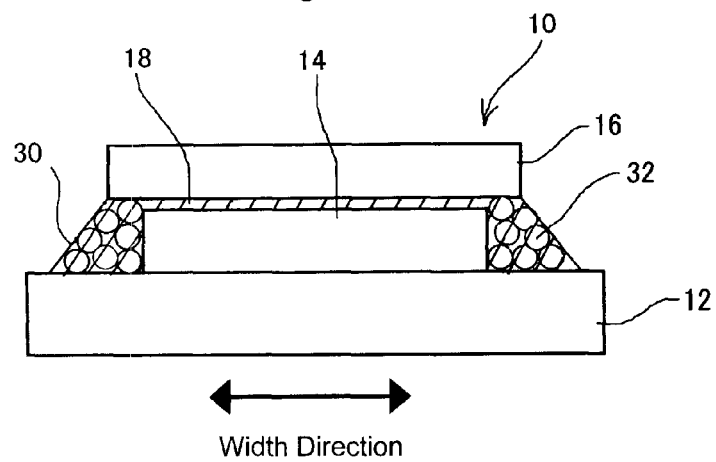
FIG. 3 is a vertical cross-sectional view schematically showing a scale structure of a first embodiment according to the present invention.
Figure 4:
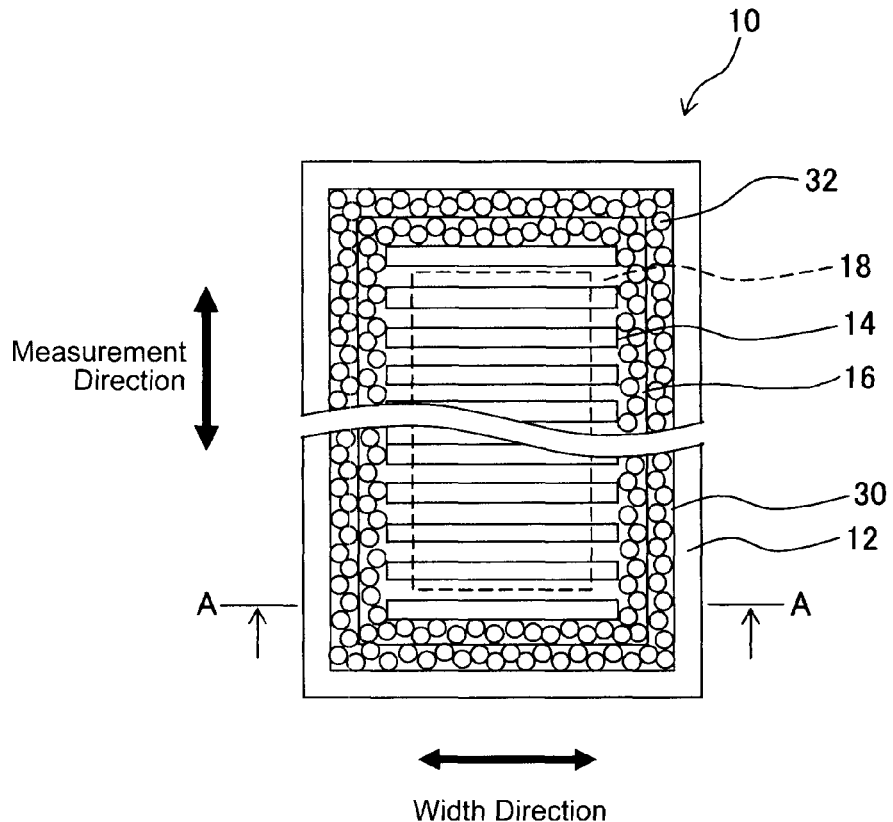
FIG. 4 is a plan view schematically showing the scale structure of the first embodiment.

FIG. 3 is a vertical cross-sectional view schematically showing a scale structure of a first embodiment according to the present invention, corresponding to a cross-sectional view taken along line A-A line in a plan view shown in FIG. 4.

Figure 1:
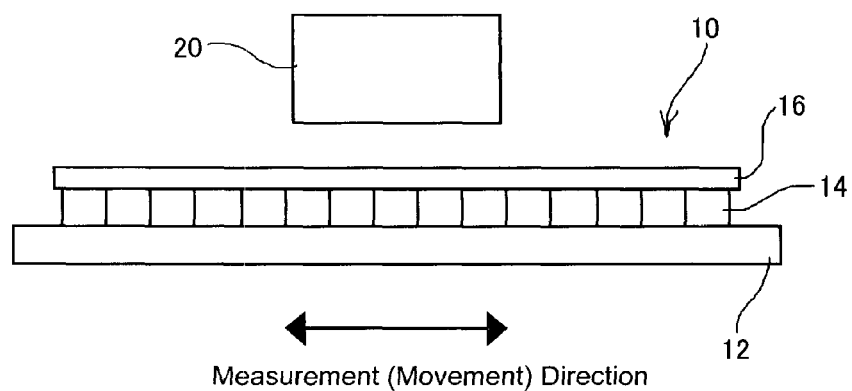
FIG. 1 is a schematic cross-sectional view showing an outline of a conventional encoder.
Figure 2:
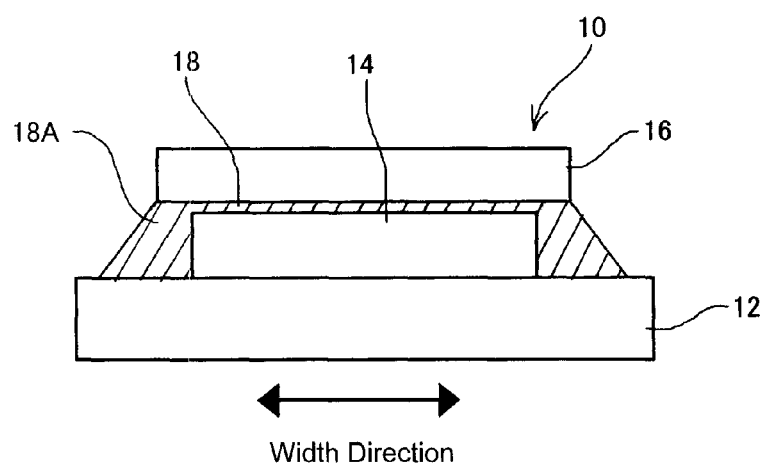
FIG. 2 is a vertical cross-sectional view schematically showing a scale structure used for the conventional encoder.

Similarly to the conventional scale as shown in FIG. 2, a scale 10 of the first embodiment includes a graduation unit 14 whose pattern is formed on a glass scale base 12 by a common deposition technique including sputtering, plating and the like, and a cover glass (scale cover) 16 provided on the top surface side of the graduation unit 14 in order to protect it. The graduation unit 14 and the cover glass 16 are joined with each other by an upper adhesive layer 18 attached along the periphery of the top surface portion of the graduation unit 14 (outside an area used for detection). It should be noted that the broken line in FIG. 4 shows the boundary of the upper adhesive layer 18.

In the first embodiment, a space between the scale base 12 and the cover glass 16 along the entire lateral periphery of the graduation unit 14 is sealed by a periphery adhesive layer 30 that is different from the previously-formed upper adhesive layer 18 and has the function of blocking the penetration of graduations-deteriorating components.

The periphery adhesive layer 30 is formed by an adhesive agent that is obtained by mixing a conventional acrylic or epoxy adhesive agent with glass powder 32 as a powder material blocking the penetration of the graduations-deteriorating components such as moisture and gas existing around usage environment, and that is filled in the space between the scale base 12 and the cover glass 16 along the entire lateral periphery of the graduation unit 14 using a dispenser to seal the space without leaving any space.

As the glass powder used herein, it is preferable to use glass of the same kind as that of the scale base 12 in order to avoid adverse effects on a temperature history, but this is not restrictive. Ceramic or metal powders may be used, and transparent or nontransparent plastic powders may also be used as long as the similar functions are provided.

Figure 5:
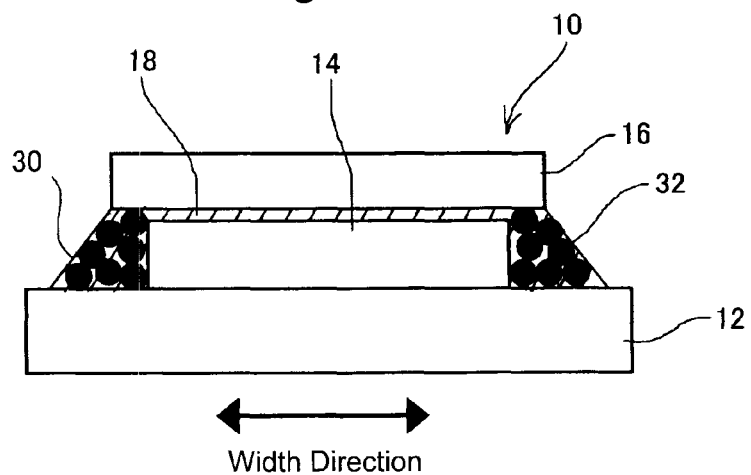
FIG. 5 is a vertical cross-sectional view schematically showing a scale structure of a second embodiment according to the present invention.

When a powder material is nontransparent as in a second embodiment shown in FIG. 5, it is possible to prevent entry of ambient disturbance light even when an adhesive agent is transparent.

Figure 6:
FIG. 6 is a cross-sectional view showing a modification of a powder shape.

The shape of the powder material is not limited to the globular shape as shown in the drawings, and may have a randomly-crushed amorphous shape as illustrated in FIG. 6.

An appropriate particle diameter may be several nm to several μm, depending on the thickness of the graduation unit 14.

As a specific example of the scale 10 of the above-described embodiments, the scale base 12 may have a thickness of 0.8 to 10 mm. The graduation unit 14 may have a thickness of 100 nm to 30 μm, and the cover glass 16 may have a thickness of 0.2 to 0.5 mm, depending on the characteristics of an encoder to be applied to.

According to the embodiments described in detail thus far, the upper adhesive layer 18 is formed in advance between the top surface portion (surface) of the graduation unit 14 and the cover glass 16 using the conventional adhesive agent, and then the periphery adhesive layer 30 mixed with the glass powder 32 is arranged for sealing along the periphery (the entire lateral periphery) of the graduation unit 14 that is likely to absorb the graduations-deteriorating components such as moisture. The glass powder 32 makes it difficult to absorb moisture and the like in the surroundings, and thus it is possible to prevent aged deterioration of the graduation unit 14 dramatically. It should be noted that the upper adhesive layer 18 formed on the graduation unit 14 may be formed entirely when necessary, not only in the periphery of the top surface portion as described above.

It is highly effective to apply this invention to such a scale as a diffraction grating required to achieve high precision in recent years, in which the graduation unit 14 is formed to have the height of 700 to 800 nm, for example, and the adhesive layer is getting thicker accordingly, in order to achieve a high aspect ratio.

Figure 7:
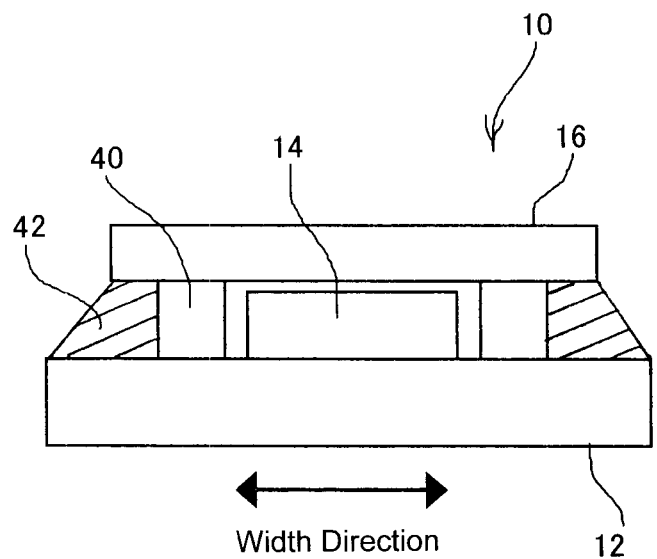
FIG. 7 is a vertical cross-sectional view schematically showing a scale structure of a third embodiment according to the present invention.
Figure 8:
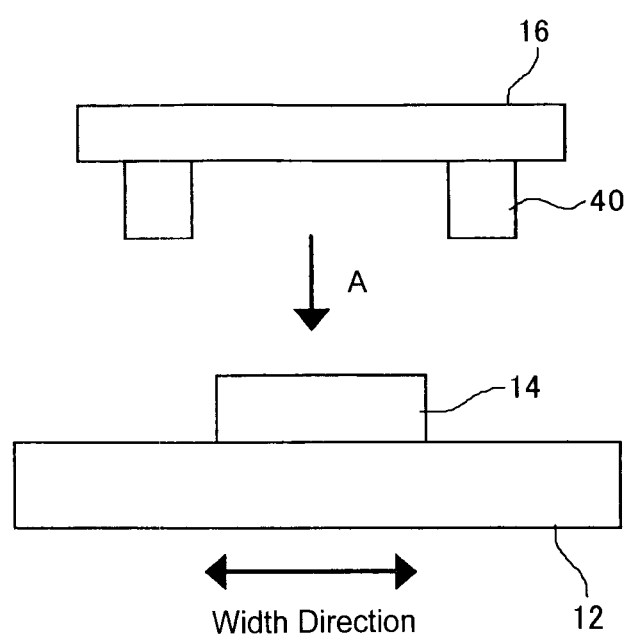
FIG. 8 is a cross-sectional view showing characteristics of a manufacturing process of the scale structure of the third embodiment, corresponding to FIG. 7.

FIG. 7 is a vertical cross-sectional view schematically showing a scale structure of a third embodiment according to the present invention, corresponding to FIG. 2. FIG. 8 is a corresponding cross-sectional view showing characteristics of its manufacturing process.

Similarly to the conventional scale shown in FIG. 2, a scale 10 of the third embodiment includes a graduation unit 14 whose pattern is formed on a glass scale base 12 by a common deposition technique including sputtering, plating and the like, and a cover glass 16 provided on the top surface side of the graduation unit 14 in order to protect the gradation unit 14.

In the third embodiment, a height regulating unit 40 is deposited in advance to have a pattern corresponding to the periphery of the graduation unit 14 on the lower surface of the cover glass 16, as in FIG. 8 showing its state before being supported. Next, the cover glass 16 in this state is moved down in the direction of an arrow A, and, while the lower end of the height regulating unit 40 is allowed to abut against the top surface of the scale base 12, the cover glass 16 is supported on the scale base 12 by the height regulating unit 40 provided along the periphery of the graduation unit 14. Thereafter, the scale base 12 and the cover glass 16 are joined with each other by an adhesive layer 42 formed by sealing the entire periphery of the height regulating unit 40 using an adhesive agent.

Figure 9:
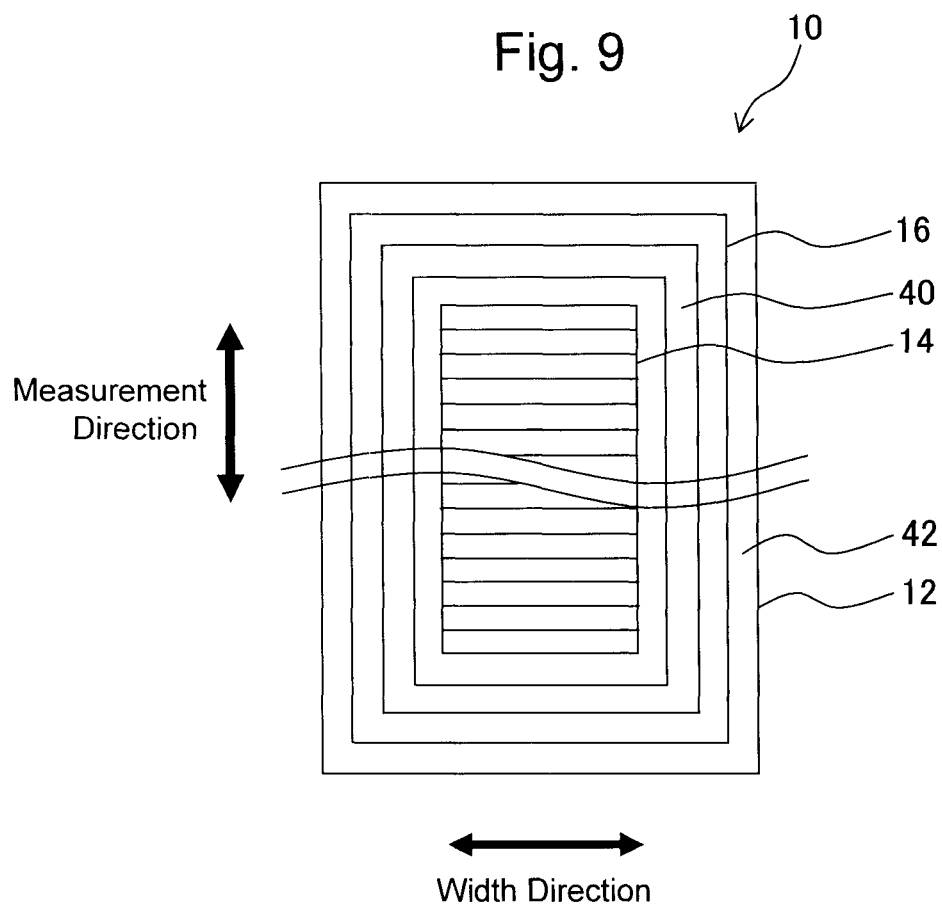
FIG. 9 is a plan view schematically showing the scale structure of the third embodiment, with its middle being omitted.

As shown in a plan view of FIG. 9, in which the middle in measurement direction is omitted, the height regulating unit 40 is formed on the lower surface of the cover glass 16 at the position corresponding to the entire periphery surrounding the graduation unit 14 to have a continuous shape and the same height (thickness), although not illustrated. By the thus formed height regulating unit 40 to have the same height continuously, it is possible to achieve high adhesiveness to the graduation unit 14. Accordingly, it is also possible to seal the periphery of the graduation unit 14 easily by the adhesive agent. It may have an intermittent shape, although caution must be taken in sealing by the adhesive agent.

When the graduation unit 14 is formed by mainly depositing chromium (Cr), copper (Cu), aluminum (Al) or the like, the metal of the same kind, that is, chromium, copper, aluminum or the like should be used for the height regulating unit 40, which is formed by depositing a pattern slightly thicker than that of the graduation unit 14 on the cover glass 16 for protecting the graduation unit 14, and arranged in the predetermined position as described above. Thus, stability against temperature changes can be secured effectively.

The graduation unit 14 may have a preferable thickness of 100 nm to 30 μm, and the height regulating unit 40 may have such a preferable thickness that allows a space between the cover glass 16 and the graduation unit 14 to be 30 nm to 0.1 mm. The both thicknesses may be varied depending on the characteristics of an encoder to be applied to.

Generally, unevenness in thickness of the deposition pattern formed on the scale base 12 and the cover glass 16 is approximately 10 nm to 50 nm. It is therefore possible to form the height regulating unit 40 as well as the graduation unit 14 to have the highly stable thickness. In addition, no adhesive agent is used between the scale base 12 and the height regulating unit 40 and between the height regulating unit 40 and the cover glass 16, in order to support the height regulating unit 40 on the scale base 12. It is possible to substantially avoid varied dimension of the space between the graduation unit 14 and the cover glass 16 in the measurement (movement) direction. Further, it is possible to omit the adhesive layer 18 as in FIG. 2 from the space therebetween. Therefore, variations in encoder output caused by unevenness in the thickness of the adhesive layer 18 can be prevented without fail.

It is preferable in terms of reliability to provide the adhesive layer 42 along the entire periphery of the height regulating unit 40 for sealing as described above, because intrusion of foreign matters upon the graduation unit 14 can be prevented. If such a high level of reliability is not required, however, the adhesive layer 42 may be provided partially along the periphery.

Figure 10:
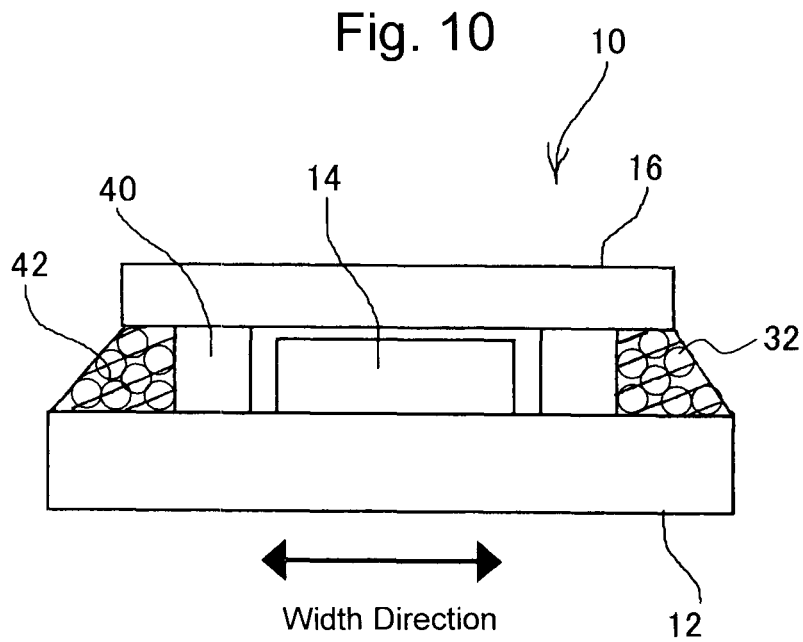
FIG. 10 is a vertical cross-sectional view schematically showing a scale structure according to a fourth embodiment of this invention.

The common acrylic or epoxy adhesive agent may be used for forming the adhesive layer 42. If the entire periphery of the height regulating unit 40 is sealed in particular, an adhesive agent mixed with a glass, ceramic or metal powder material 32 that blocks penetration of graduations-deteriorating components such as moisture and gas may be used in order to further improve the reliability, as in a fourth embodiment shown in FIG. 10.

In the above-described embodiments, explanations are made by taking the scale of a linear encoder as an example, in which the graduation unit 14 detects linear movement, but this is not restrictive. A scale may have a graduation unit for an arc encoder detecting arc movement or a rotary encoder detecting rotary movement. Also, the present invention is not limited to the photoelectric scale of a light transmission type, and may be a reflective type. Of course it may be applied to various scales for a capacitive encoder, magnetic encoder, electromagnetic induction type encoder and the like.

The scale base 12 may be made by a resin, not only glass. The reflective-type photoelectric scale, for example, may be made by ceramic or metal.

The scale cover is not limited to the cover glass, and may be a resin sheet (film).

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A structure for protecting scale graduations in which a graduation unit formed on a scale base is protected by a scale cover arranged on a top surface side thereof, wherein
    a space between the scale base and the scale cover along an entire lateral periphery of the graduation unit is sealed using an adhesive agent mixed with a powder material blocking penetration of graduations-deteriorating components.

2. The structure for protecting scale graduations according to claim 1, wherein the powder material is glass, ceramic or metal.

3. The structure for protecting scale graduations according to claim 1, wherein the powder material is transparent or nontransparent.

4. The structure for protecting scale graduations according to claim 1, wherein the powder material has a globular shape or an amorphous shape.

5. The structure for protecting scale graduations according to claim 1, wherein the powder material has a particle diameter of several nm to several μm.

6. The structure for protecting scale graduations according to claim 1, wherein a space between an upper surface portion of the graduation unit and the scale cover is also sealed using an adhesive agent.

7. A structure for protecting scale graduations in which a graduation unit formed on a scale base is protected by a scale cover arranged on a top surface side thereof, wherein the scale cover is supported on the scale base by a height regulating unit provided along a periphery of the graduation unit.

8. The structure for protecting scale graduations according to claim 7, wherein:

the height regulating unit is formed on a lower surface of the scale cover in advance to have a pattern corresponding to the periphery of the graduation unit, and a lower end of the height regulating unit is allowed to abut against a top surface of the scale base; and the scale base and the scale cover are joined with each other using an adhesive agent provided along the periphery of the height regulating unit.

9. The structure for protecting scale graduations according to claim 7, wherein the height regulating unit is deposited on the lower surface of the scale cover.

10. The structure for protecting scale graduations according to claim 7, wherein the height regulating unit is formed to have the same thickness continuously on the lower surface of the scale cover at a position corresponding to the entire periphery of the graduation unit.

11. The structure for protecting scale graduations according to claim 7, wherein the graduation unit has a thickness of 100 nm to 30 μm, and the height regulating unit has such a thickness that allows a space between the cover glass and the graduation unit to be 30 nm to 0.1 mm.

12. The structure for protecting scale graduations according to claim 7, wherein the height regulating unit is formed from metal including chromium, copper or aluminum.

13. The structure for protecting scale graduations according to claim 7, wherein the height regulating unit is deposited from the same material as that of the gradation unit.

14. The structure for protecting scale graduations according to claim 7, wherein a space between the scale base and the scale cover along an entire lateral periphery of the graduation unit is sealed using an adhesive agent mixed with a powder material blocking penetration of graduations-deteriorating components.

* * * * *